Dec. 10, 1968    H. ABRAMOWITZ ET AL    3,415,177
X-RAY FILM DEVELOPING RACK HOLDER AND DRIP STAND
Filed Dec. 29, 1966    4 Sheets-Sheet 2
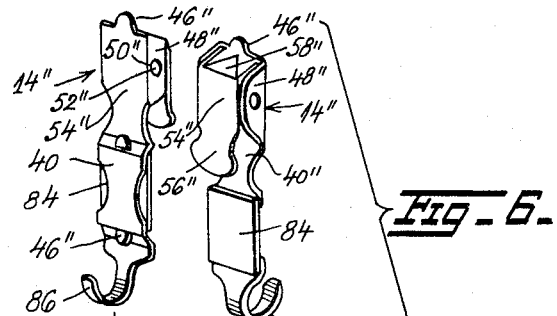
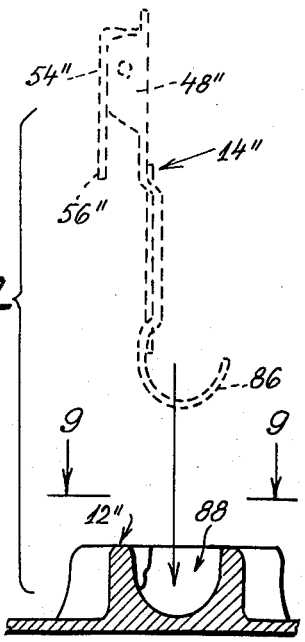
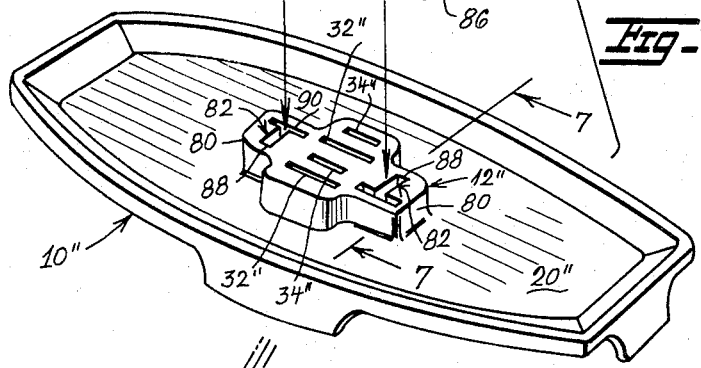
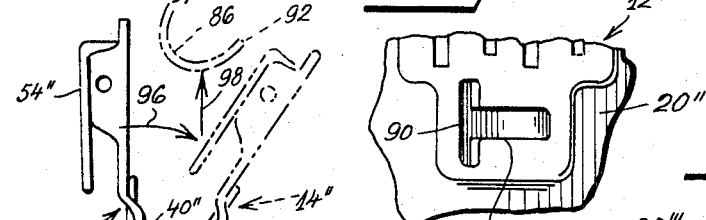
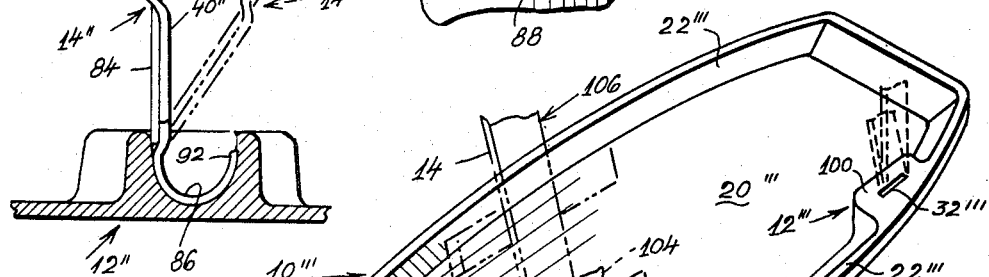
INVENTORS
Herbert Abramowitz
& Elihu Sachs
BY Polachek & Saulsbury
ATTORNEYS

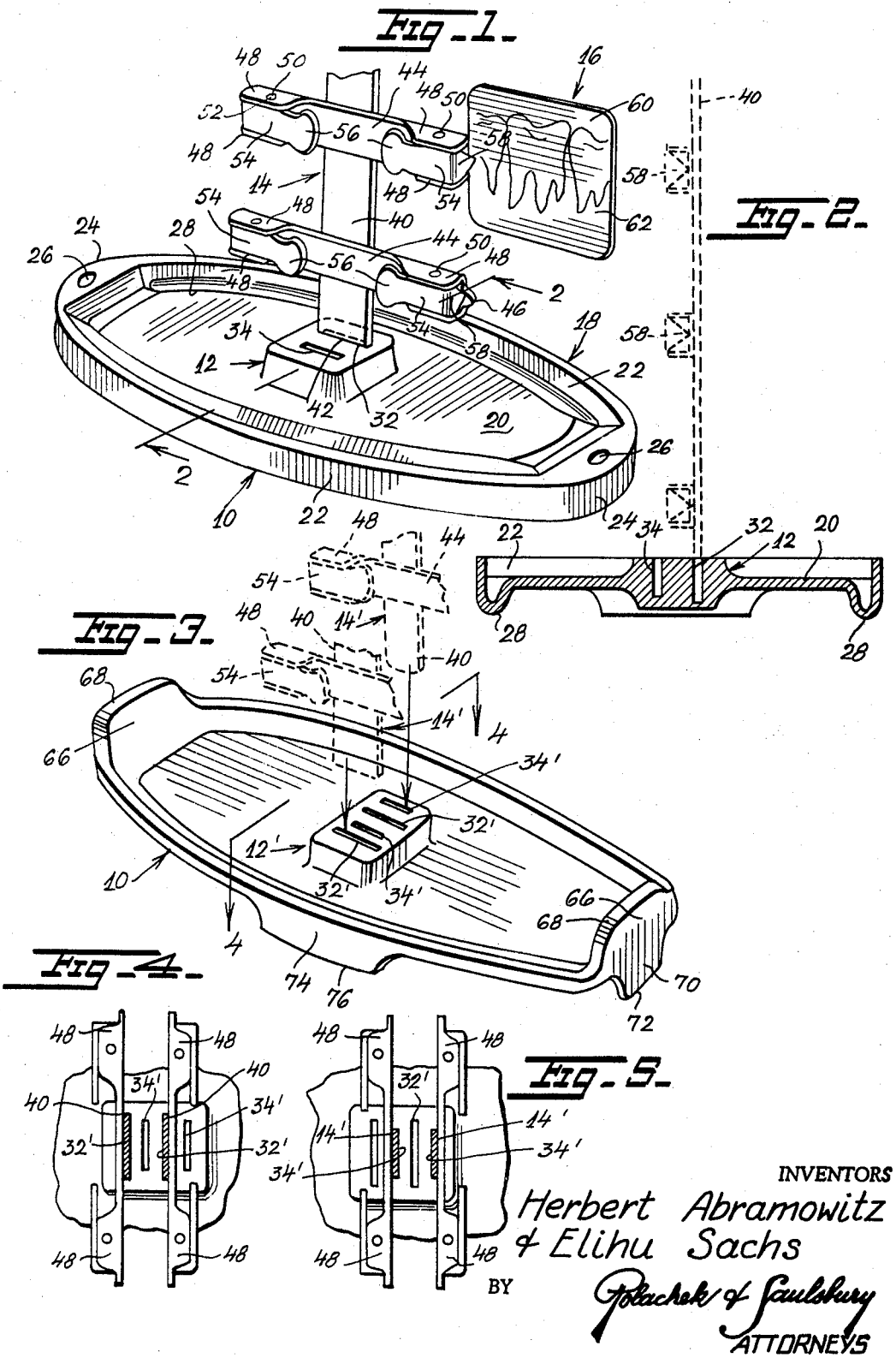

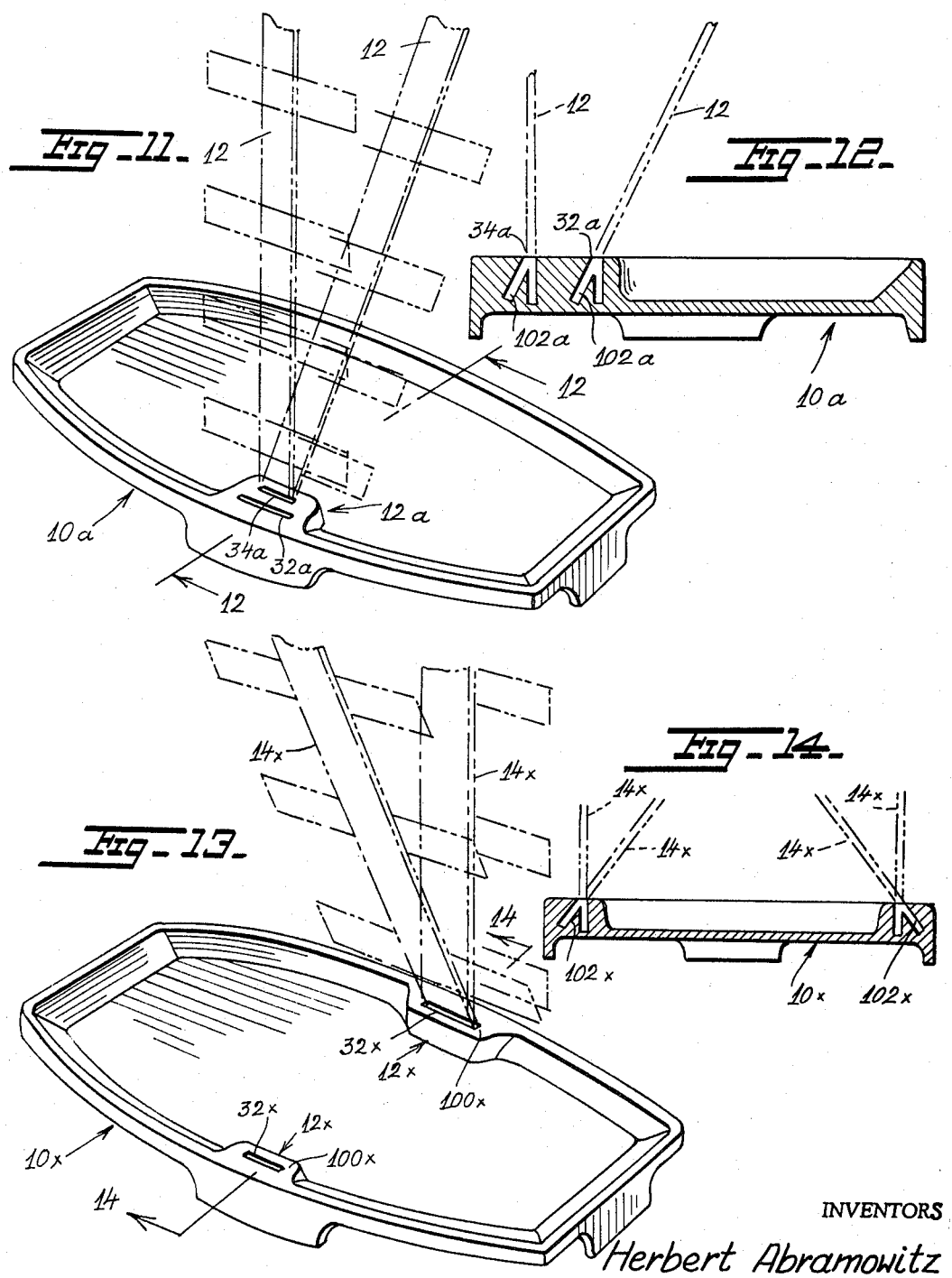

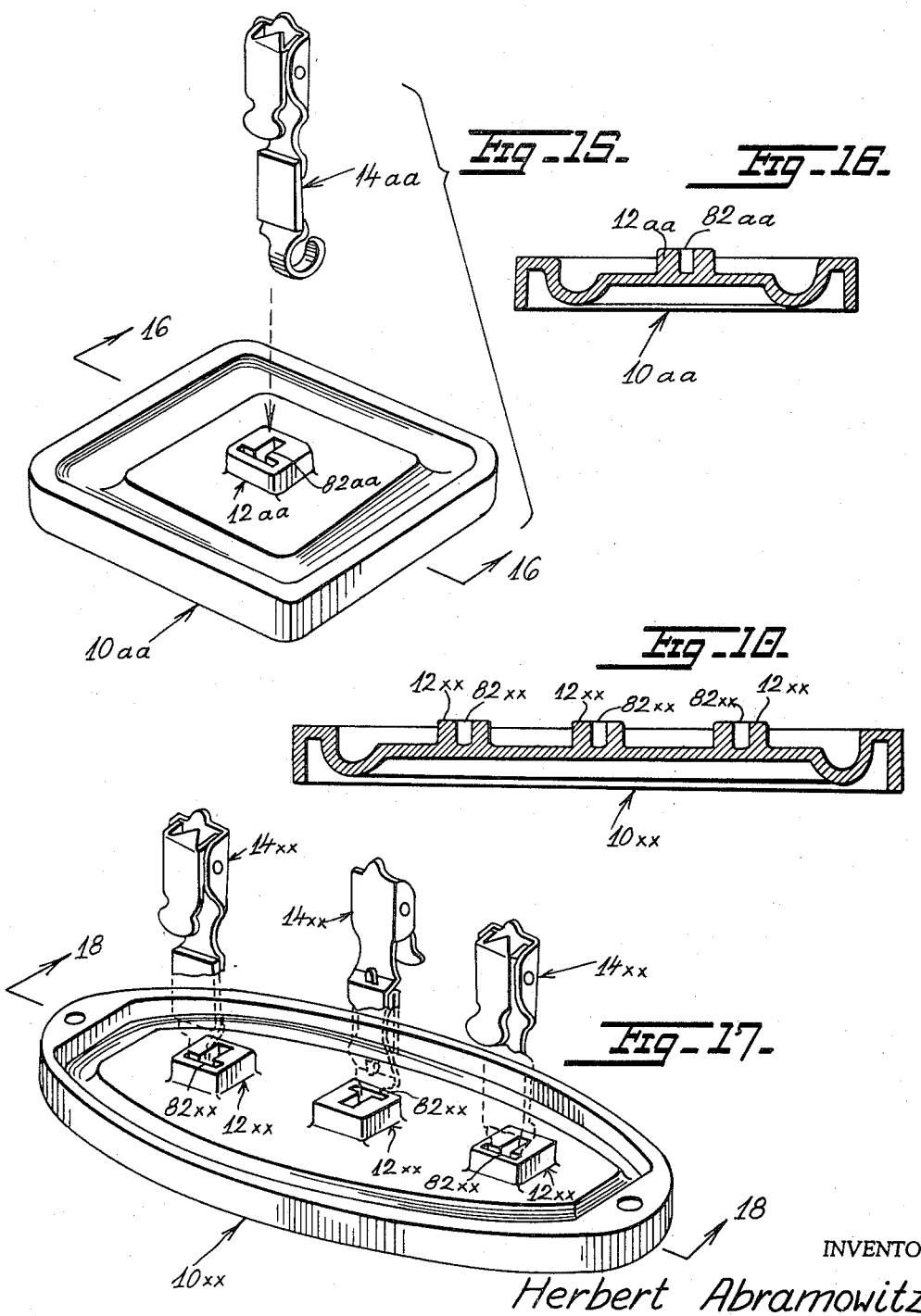

United States Patent Office 3,415,177
Patented Dec. 10, 1968

3,415,177
X-RAY FILM DEVELOPING RACK HOLDER
AND DRIP STAND
Herbert Abramowitz, 143—19 25th Ave., Whitestone,
N.Y. 11357, and Elihu L. Sachs, 930 Cranford Ave.,
Valley Stream, N.Y. 11581
Filed Dec. 29, 1966, Ser. No. 605,871
2 Claims. (Cl. 95—100)

ABSTRACT OF THE DISCLOSURE

A film rack holder and drip tray adapted to be economically manufactured from readily available material and which will provide a firm support for the film rack to hold the support in an upright position in which the films carried thereby are clearly visible. The combined holder and tray includes an upright member with cross arms for supporting films, and a tray with bottom and side walls, the bottom wall having an integral enlargement thereon with slots constituting a socket for receiving the bottom end of the upright member. The film when supported is above the side wall of the tray.

This invention relates generally to the art of photography and more particularly to new and useful improvements and refinements in drip tray provided with means for detachably receiving and firmly suporting in upright position either simultaneously or separately various types of film racks primarily intended for receiving and supporting X-ray films or the like and in which such films are conveniently displayed and in which the tray serves to receive any drippage from such films.

At the present time, dental X-ray films are handled for processing by means of metal film racks employed to support the X-ray films during the development thereof, and also for displaying such films and in some instances drip trays have been provided for catching any drippage from such films. However, these prior art devices did not provide a suitable support for the film rack, and in most instances the rack was designed to be suspended with the drip tray suspended beneath such rack.

Since it is often highly desirable and at some times extremely necessary to inspect X-ray films at the earliest possible moment after development and since such films are of course still wet and subject to drippage, some means for supporting such films and preventing dripping on surrounding surfaces or objects represents a highly desirable piece of equipment, and if such drip-catching means further provides a firm support for the film rack, the usefulness thereof is materially increased. Furthermore, since at least two types of film racks are available it is highly desirable that the drip tray and film rack support of this invention accommodate either type of film rack and provide a firm support for the same without in any way obscuring the films carried thereby.

Therefore an important object of the present invention is to provide a duplex film rack supporting means and drip tray which may be economically manufactured from readily available material and which will provide a firm support for the film rack to hold the same in an upright position in which the films carried thereby are clearly visible.

Another object of the invention is to provide a duplex film rack support and drip tray including means for detachably and firmly receiving at least two types of film racks and for supporting the same in an upright position without danger of tilting in any direction.

Yet another object of the invention is to provide a duplex film rack support and drip tray which may be conveniently molded in one-piece, thus materially contributing to simplicity of design and economical manufacture.

Still another object is to provide a duplex film rack supporting means and drip tray which will operate to firmly support either simultaneously or separately at least two types of film racks in upright position and which will not in any way obscure the films carried by such racks.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a top perspective view of a duplex film rack support and drip tray of the invention, showing a fragment of a film rack in supported position and showing an X-ray film supported by the rack.

FIG. 2 is an enlarged cross-sectional view taken on the plane of the line 2—2 of FIG. 1 showing a rack in supported position in dash lines.

FIG. 3 is a view similar to FIG. 1 of a duplex film rack support and drip tray embodying a first modified form of the invention, showing a pair of racks preparatory to insertion into the rack support, in dash lines.

FIG. 4 is a view as seen from the line 4—4 of FIG. 3 showing the bottom ends of the rack bodies in the large slotted sockets.

FIG. 5 is a similar view showing the bottom end of the rack bodies in the smaller slotted sockets.

FIG. 6 is a top perspective view of a film rack support and drip tray embodying a second modified form of the invention, a pair of another type of film racks being shown preparatory to insertion into the rack support.

FIG. 7 is a cross-sectional view taken on the plane of line 7—7 of FIG. 6, the rack being shown in dash lines.

FIG. 8 is a similar view but showing the rack in operative position in the rack support in full lines and showing the rack in tilted position in dash lines.

FIG. 9 is a view as seen from the line 9—9 of FIG. 7.

FIG. 10 is a view similar to FIG. 1 of a duplex film rack support and drip tray embodying a third modified form of the invention, racks being shown in upright and slanted operative positions in dash lines.

FIG. 10a is a sectional view on the line 10a—10a of FIG. 10.

FIG. 11 is a view similar to FIG. 1 of a duplex film rack support and drip tray embodying a fourth modified form of the invention, racks being shown in operative upright position and in operative slanted position in dash lines.

FIG. 12 is an enlarged cross-section view taken on the plane of the line 12—12 of FIG. 11.

FIG. 13 is a top perspective view of a duplex film rack support and drip tray embodying a fifth modified form of the invention, a rack being shown in operative upright position and in operative slanted position in dash lines.

FIG. 14 is a cross-sectional view taken on the plane of the line 14—14 of FIG. 13 showing racks in both rack supports.

FIG. 15 is a view similar to FIG. 6 of a film rack support and drip tray embodying a sixth modified form of the invention, another type of film rack being shown preparatory to insertion into the rack support.

FIG. 16 is a sectional view taken on the plane of the line 16—16 of FIG. 15.

FIG. 7 is a view similar to FIG. 6 of a film rack support and drip tray embodying a seventh modified form of the invention, a plurality of different types of film racks being shown preparatory to insertion into the rack support.

FIG. 18 is a sectional view taken on the plane of the line 18—18 of FIG. 17.

Referring now in detail to the various views of the drawings, in FIG. 1 there is shown a drip tray 10 and a film rack support 12 embodying one form of the invention. A duplex type film rack 14 is shown removably supported in the rack support 12 and an X-ray film 16 is shown removably supported by the rack 14.

The tray 10 may be formed of suitable metal or plastic and is formed with an oval-shaped body 18 having a flat bottom wall 20 and upright curved side walls 22 and end walls 24. The end walls 24 are thickened and formed with holes 26 to receive fastening elements for securing the tray to a horizontal supporting surface. The bottom wall is indented at the bases of the side walls 22 forming gutters 28.

In accordance with the invention, at the center of the top surface of the bottom wall 20 a substantially rectangular enlargement is formed extending above and below the bottom wall 20 and providing the rack support 12. The top surface of the enlargement is flat and flush with top surfaces of the side and end walls. A pair of closely spaced slotted sockets 32 and 34 in parallel arrangement is formed in the body of the enlargement opening upwardly and being rectangular in cross-section. The slotted socket 32 is larger and deeper than the slotted socket 34 (see FIG. 2). The slotted sockets are adapted to receive and support film racks in a manner to be presently described.

The duplex film rack support 12 and drip tray 10 of this invention are intended to detachably receive and firmly support various types of film racks. A fragment of one type of duplex film rack 14 is shown in FIG. 1 and may comprise an elongated flat rectangular smooth metal bar 40 with one end 42 straight and square-cornered. A plurality of flat short rectangular cross bars 44 is preferably welded to one surface of the bar 40 spaced therealong. At each extreme end of each cross arm 44, a curved lug 46 is formed, forming an extension of the cross arm. Inwardly of each lug 46 there is formed a pair of opposed outwardly extending flanges 48, 48 along the edges of the body. A shaft 50 is journalled in holes 52 formed in said flanges. A spring-loaded clip including a flat metal body 54 is fixed to the shaft 50 closing the space between the top of the flanges. The body 54 is formed at one end with a finger piece 56 and at its other end formed with a triangular shaped clamp 58 disposed at right angles to the plane of the body 54.

The pointed end of the clamp 58 is adapted to normally engage the lug extension 46 on the body of the cross arm 44. Each extension 46 in coaction with its respective pointed triangular clamp 58 of the clip is intended to detachably support a film, such as the X-ray film 16 shown in FIG. 1, which has a thin flat translucent plastic body 60 for displaying pictures of human teeth 62. The side walls of the slotted sockets 32 and 34 securely support the film rack 14 in upright position with the side walls of the sockets preventing tilting of the rack and the bottom walls of the sockets preventing downward movement of the racks below the point where the lowermost films supported on the racks will be clearly visible above the side walls of the drip tray 10.

A modified form of film rack support 12' and modified drip tray 10' are illustrated in FIGS. 3 to 5, inclusive. The rack support 12' differs from the rack support 12 of FIG. 1 in that instead of only two slotted sockets, such as sockets 32 and 34, four of such sockets are provided, a pair of long sockets 32', 32, and a pair of short sockets 34', 34', the long and short sockets alternating. These sockets provide supports for four racks 14', two being of the wide type and two of the narrow type dimensioned to be accommodated in the sockets.

The drip tray 10' differs from the drip tray 10 in that the end walls instead of being enlarged are formed with upwardly extending flanges 66 with straight flat top edges 68 and are formed with downwardly extending flanges 70 formed with straight bottom edges 72. Midway the ends of the body of the tray 10', downwardly extending flanges 74 with straight flat bottom end edges 76 are provided. The straight flat edges of the flanges of the tray permit the trays 10' to be stacked one upon another.

FIGS. 6 to 8, inclusive, illustrate a second modified form of film rack support 12" and modified drip tray 10". The rack support 12" is similar to the rack support 12' of FIG. 3 except that the enlargement at the center of the bottom wall 20" forming the rack support 12" extends above the top surface of the bottom wall only. The support 12" also is formed with integral side extensions 80, 80. The support proper includes the pairs of slotted sockets 32", 32" and 34", 34" of support 12' of FIG. 3 and in addition the extensions 80, 80 are formed with T-shaped slotted sockets 82, 82 intersecting the top surfaces thereof. The pairs of sockets 32", 32" and 34", 34" are adapted to receive and support film racks of the type of racks 14 of FIG. 1 and racks 14' of FIG. 3, but the sockets 82, 82 are adapted to receive and support another type of rack, such as the racks 14", 14" shown in FIG. 6. The racks 14" each has an elongated flat metal body 40" with curved lug extensions 46" at the ends thereof. Opposed flanges 48" with opposed holes 52" therein are formed along the long edges at one end thereof. A shaft 50" is journalled in the holes 52" and a spring-pressed clip is fixed on the shaft having a flat body portion 54" with finger piece 56" at one end and a right angular pointed clamp 58" at the other end, the point of the clamp adapted to engage the adjacent lug extension 46". A rectangular shaped plate 84 is welded to one face of the body 40" and extends below the other end thereof, terminating in a hook 86 inwardly of the opposite face of the body. The hooked end 86 of the rack 14" is adapted to be inserted into the T-shaped slotted socket 82 of the support 12", the curved body of the hook being adapted to extend through the stem portion 88 of the T-shaped socket and the plate 84 adapted to extend through the cross-piece 90 of the T-shaped socket. When the rack 14" is fully inserted in the T-shaped socket, the curved hook 86 fits on the base of the stem portion 88 of the socket, as seen in FIG. 8, with the tip 92 of the hooked end seated against a semi-spherical protuberance 94 formed on the inner side of the end wall of the stem portion 88 at the top thereof, whereby the rack is held firmly in upright position as shown in FIG. 8. In order to release the rack 14" from the T-shaped socket, it is merely necessary to tilt the rack forwaradly and laterally in the direction of arrow 96 whereby the tip 92 of the hooked end is moved away from the protuberance 94 permitting the rack to be lifted bodily upwardly as shown by the arrow 98 in FIG. 8, free of the rack support. In this type of rack 14", the film such as the film 16 of FIG. 1 is arranged with its edge across the outer ends of the flanges 48" clamped between the pointed end of clamp 58" and the lug extension 46" holding the film in vertical upright position forming an extension of the rack 14".

In using the rack support 12", racks such as the duplex film racks 14 of FIG. 1 and the racks 14' of FIG. 3 may be inserted and supported in the sockets 32", 32", 34", 34".

A third modification of the invention is shown in FIGS. 10 and 10a wherein the construction of the drip tray 10''' is somewhat similar to the drip tray 10" of FIG. 6. In this form of the invention however the support for the racks is moved from the center of the bottom wall 20''' of the tray 10''' to one of the side walls 22''' thereof. Said one side wall 22''' of the body of the tray is formed with rack supports 12''' adjacent each end thereof. Each rack support 12''' is constituted by an enlargement 100 of the side walls extending inwardly thereof, the enlargement 100 disposed lengthwise of and parallel to said one side wall 22'''. The main portion of the socket 32''' extends truly vertically as seen in FIG. 10a and the socket is provided with a branch slotted portion 102 extending at a slant to the vertical as seen in FIG. 10a.

In using the slotted sockets 32''', a rack such as the duplex film rack 14 of FIG. 1 is inserted into the socket 32''' so as to protrude either into the vertical portion of the socket for supporting the rack 14 in straight upright position as indicated in dash lines 104 in FIG. 10 or into the branch slanted portion 102 for supporting the rack at an angle to the vertical as indicated at 106 in FIG. 10.

The fourth modification of the invention illustrated in FIGS. 11 and 12 is somewhat similar to the third modification of FIGS. 10 and 10a differing only in providing a single rack support 12a of the tray 10a on each side wall 22a thereof, midway the ends of each, instead of providing a rack support adjacent each end of only one side wall. Furthermore, the rack support 12a is formed with a pair of spaced parallel slot sockets 32a and 34a, the socket 32a being longer than the socket 34a.

Both sockets 32a and 34a are formed with a main straight vertical portion and the intersecting branch portion 102a whereby the rack 14 may be supported either in a vertical upright position or in a position at a slant to the vertical as shown in dash lines.

A fifth modification of the invention is illustrated in FIGS. 13 and 14 consisting of a combination of a third and fourth modification of FIGS. 10 and 11, respectively. Herein the drip tray 10x is provided with a rack support 12x at each side thereof, midway its ends. The rack support 12x is similar in construction to the rack support 10''' of FIG. 10 comprising an enlargement 100x with slotted socket 32x formed therein having a vertical portion and a slanting branch portion 102x, for holding racks such as racks 14 in either vertical or slanting position.

Yet another sixth modified form of the invention is shown in FIGS. 15 and 16 comprising a modified film rack support 12aa and a modified drip tray 10aa. The tray 10aa differs from the tray 10'' of FIG. 6 in that it is square in shape instead of being substantially rectangular, and the rack support 12aa is square in shape with only a single T-shaped slotted socket 82aa instead of being substantially rectangular in shape with a plurality of sockets. The socket 82aa is adapted to receive a film rack 14aa similar to the film rack 14'' of FIG. 6.

The seventh modified form of the invention shown in FIGS. 17 and 18 is somewhat similar to the form of the invention shown in FIG. 1 differing only in providing a plurality of spaced rack supports 12xx instead of only a single support, on the tray 10xx and wherein the supports each has only a single T-shaped slotted socket 82xx similar to the socket 82 of FIG. 6 for receiving film racks 14xx similar to racks 14'' of FIG. 6.

While we have illustrated and described the preferred embodiments of our invention, it is to be understood that we do not limit ourselves to the precise constructions herein disclosed and that various changes and modifications may be made within the scope of the invention as defined in the appended claims.

What we claim is:

1. A film rack support and drip tray comprising a tray having a bottom, side and end walls, at least one integral enlargement on one of said walls having at least one slotted socket therein whereby the end of a film rack having film supporting means thereon may be detachably received in said socket and retained therein by the walls of said slotted socket, the walls of said socket preventing tilting of said film rack, the film supporting means being disposed above the socket and above the side walls of the tray wherein the films are visible above the side walls, the bottom wall having gutters at the bases of walls to receive the drippings from films supported thereabove, said enlargement being on the bottom wall of the tray centrally thereof and being provided with lateral extensions, the enlargement proper being provided with four slotted sockets in spaced parallel arrangement, one pair of the slotted sockets being longer than the outer pair, the longer and shorter sockets alternating, said latter sockets adapted to receive ends of film racks of various widths, the extensions on the enlargement proper having T-shaped slotted sockets therein for detachably receiving the curved ends of film racks, and protuberances on the top edges of the stem portions of said T-shaped slotted sockets adapted to engage the tip ends of the curved ends of the film racks to hold the film racks against displacement, the end walls having holes for receiving fastening elements for fastening the tray to a support.

2. In combination, a film holder, a support and drip tray, said film holder comprising an upstanding flat metal bar, spaced arms extending across said bar, a curved lug at each extreme end of each arm, forming an extension of the cross arm, a pair of opposed outwardly extending flanges along the edges of the arms inwardly of the lugs, a spring loaded clip pivoted between said flanges, an integral finger piece on one end of each clip, and a triangular shaped clamp at the other end of each clip for clamping the edge of the film adjacent the arm, said clamp being disposed at right angles to the plane of the body of the clip, said clamp adapted to engage the end of the arm adjacent the lug, said support having a pair of slotted sockets to receive and support the upright metal bar.

References Cited

UNITED STATES PATENTS

| | | | |
|---|---|---|---|
| 183,985 | 10/1876 | Staehlen | 248—471 |
| 2,759,406 | 8/1956 | Ingham | 95—100 |
| 2,766,670 | 10/1956 | Fritts | 95—100 |
| 3,009,284 | 11/1961 | Ryan | 248—346 XR |

FOREIGN PATENTS

| | | |
|---|---|---|
| 1,078,829 | 11/1954 | France. |
| 286,235 | 3/1928 | Great Britain. |

ROY D. FRAZIER, *Primary Examiner.*

J. F. FOSS, *Assistant Examiner.*

U.S. Cl. X.R.

248—346; 211—13